United States Patent
Kim et al.

(10) Patent No.: US 11,537,350 B2
(45) Date of Patent: Dec. 27, 2022

(54) INFINITELY EXPANDABLE DISPLAY APPARATUS BASED ON ELECTROLUMINESCENT DISPLAY TYPE AND DRIVING METHOD THEREOF

(71) Applicant: LG Display Co., Ltd., Seoul (KR)

(72) Inventors: Tae Gung Kim, Paju-si (KR); Dae Hyeon Park, Goyang-si (KR); Dae Sung Park, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/523,829

(22) Filed: Nov. 10, 2021

(65) Prior Publication Data

US 2022/0188058 A1  Jun. 16, 2022

(30) Foreign Application Priority Data

Dec. 14, 2020 (KR) ........................ 10-2020-0174247

(51) Int. Cl.
*G06F 3/14* (2006.01)
*H04W 4/80* (2018.01)
*G06F 3/147* (2006.01)

(52) U.S. Cl.
CPC ............ *G06F 3/1446* (2013.01); *G06F 3/147* (2013.01); *H04W 4/80* (2018.02)

(58) Field of Classification Search
CPC ......... G09G 2300/026; G09G 2360/04; G09G 2320/045; G09G 2370/04; G09G 3/3233; G09G 5/14; G09G 5/006; G09G 3/006; G09G 2320/0233; G09G 2320/0257; G06F 3/1446; G06F 3/147; G09F 9/3026; H01L 27/3293; H04W 4/80; H04W 4/023
See application file for complete search history.

(56) References Cited

U.S. PATENT DOCUMENTS

| | | | |
|---|---|---|---|
| 10,996,912 B2 * | 5/2021 | Yueh | G06F 3/1431 |
| 2016/0019831 A1 * | 1/2016 | Hall | G06F 1/1601 |
| | | | 345/82 |
| 2019/0065133 A1 * | 2/2019 | Liu | G06F 3/1446 |

* cited by examiner

*Primary Examiner* — Koosha Sharifi-Tafreshi
(74) *Attorney, Agent, or Firm* — Fenwick & West LLP

(57) ABSTRACT

An infinitely expandable display apparatus and a driving method thereof are disclosed. An infinitely expandable display apparatus includes a cabinet including a plurality of display units each having an application specific integrated circuit (ASIC) embedded therein, a set board generating a driving command signal needed for driving of the cabinet, and a set interface circuit connecting the set board to the cabinet. The plurality of display units are connected to one another through a unidirectional interface circuit, and at least one of the plurality of display units transfers the driving command signal and an execution result signal based thereon to a neighbor display unit on the basis of a cascading scheme.

18 Claims, 17 Drawing Sheets

FIG. 2

| DIVISION | RESOLUTION | Remark |
|---|---|---|
| | WIDTH X LENGTH | |
| Diplay Unit | 480 x 270 | ASIC DRIVING MINIMUM UNIT |
| Cabinet | 1,920 x 1,080 | SET DRIVING UNIT(16UNIT) |

INFINITELY EXPANDABLE DISPLAY APPARATUS BASED ON ELECTROLUMINESCENT DISPLAY TYPE AND DRIVING METHOD THEREOF

CROSS-REFERENCE TO RELATED APPLICATIONS

This application claims the benefit of Korean Patent Application No. 10-2020-0174247 filed on Dec. 14, 2020, which is hereby incorporated by reference as if fully set forth herein.

BACKGROUND

Field of the Invention

The present disclosure relates to an infinitely expandable display apparatus capable of being expanded.

Discussion of the Related Art

Recently, large-size displays are being used in various fields such as indoor and outdoor digital advertisements. In order to satisfy the demands for large-size displays, various types of tiled display systems have been proposed.

In the tiled display systems, a single screen is configured by connecting a plurality of display units, and because a screen size increases depending on the case, infinitely expandable display apparatuses are based thereon. Display units configuring a large screen may be based on a liquid crystal display type, and moreover, may be based on an electroluminescent display type. On the other hand, in infinitely expandable display apparatuses based on an electroluminescent display type, pixel sensing for compensating for pixel degradation is needed, and thus, display units should be connected to one another on the basis of a bidirectional (or two-way) communication scheme, so as to transfer sensing data along with image data. Therefore, in infinitely expandable display apparatuses based on an electroluminescent display type of the related art, a communication interface is complicated, and the manufacturing cost is high.

SUMMARY

To overcome the aforementioned problem of the related art, the present disclosure may provide an infinitely expandable display apparatus, in which a communication interface is simplified in complexity and the manufacturing cost is reduced, and a driving method of the infinitely expandable display apparatus.

To achieve these objects and other advantages and in accordance with the purpose of the disclosure, as embodied and broadly described herein, an infinitely expandable display apparatus includes a cabinet including a plurality of display units each having an application specific integrated circuit (ASIC) embedded therein, a set board generating a driving command signal needed for driving of the cabinet, and a set interface circuit connecting the set board to the cabinet. The plurality of display units are connected to one another through a unidirectional interface circuit, and at least one of the plurality of display units transfers the driving command signal and an execution result signal based thereon to a neighbor display unit on the basis of a cascading scheme. The set board transfers the driving command signal to a first display unit based on the cascading scheme through a first communication line included in the set interface circuit. A last display unit based on the cascading scheme transfers the execution result signal to the set board through a second communication line included in the set interface circuit.

In another aspect of the present disclosure, a driving method of an infinitely expandable display apparatus, including a cabinet including a plurality of display units each having an application specific integrated circuit (ASIC) embedded therein and a set board connected to the cabinet, includes outputting a driving command signal needed for driving of the cabinet by using the set board and transferring the driving command signal and an execution result signal based thereon to a neighbor display unit on the basis of a cascading scheme by using at least one of the plurality of display units connected to one another through a unidirectional interface circuit, wherein the driving command signal output from the set board is transferred to a first display unit based on the cascading scheme, and the execution result signal output from a last display unit based on the cascading scheme is transferred to the set board.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2 is a diagram illustrating a resolution based on a unit of driving of the infinitely expandable display apparatus illustrated in FIG. 1;

DETAILED DESCRIPTION OF THE DISCLOSURE

Figure 1:
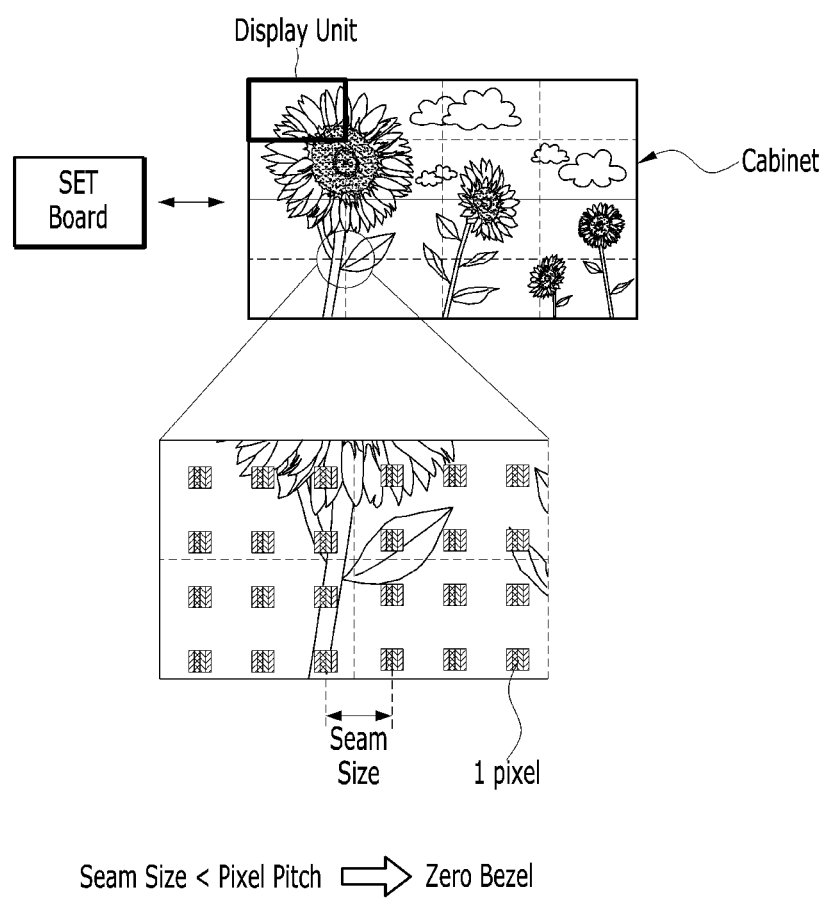
FIG. 1 is a diagram schematically illustrating an infinitely expandable display apparatus according to an embodiment of the present disclosure.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on-", "over-", "under-", and "next-", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 3:
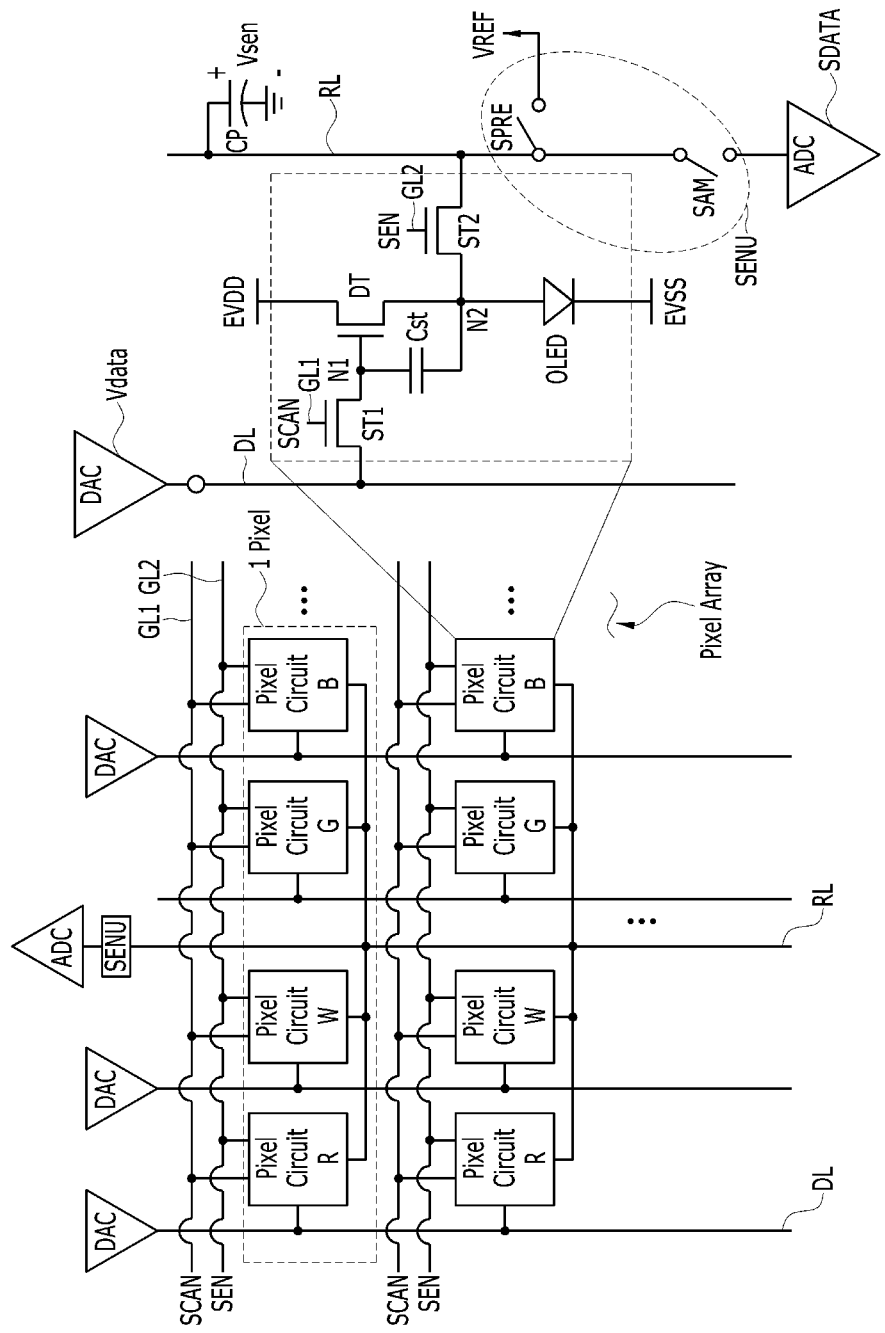
FIG. 3 is a diagram illustrating a configuration of a display unit in an infinitely expandable display apparatus.
Figure 4:
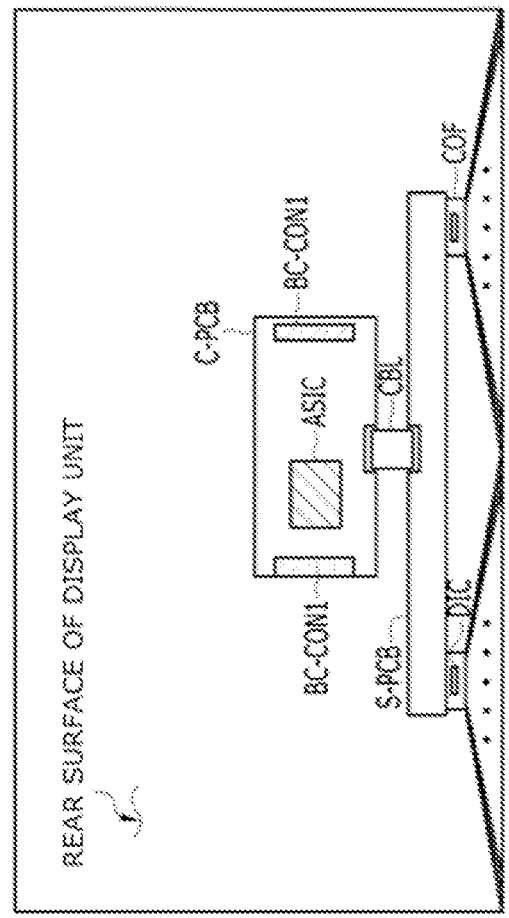
FIG. 4 is a diagram illustrating a configuration of a panel driving circuit of a display unit in an infinitely expandable display apparatus.
Figure 5:
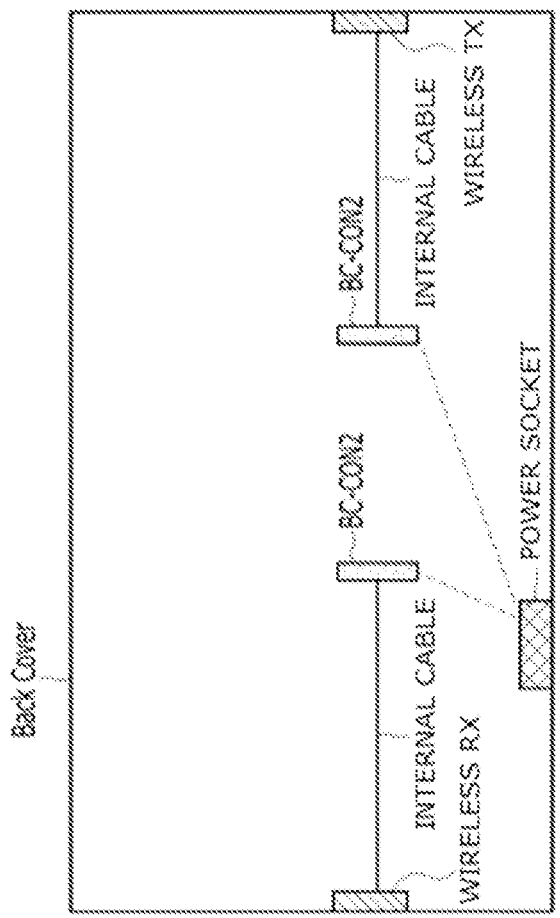
FIG. 5 is a diagram illustrating a configuration of a back cover of a display unit in an infinitely expandable display apparatus.

FIG. 1 is a diagram schematically illustrating an infinitely expandable display apparatus according to an embodiment of the present disclosure. FIG. 2 is a diagram illustrating a resolution based on a unit of driving of the infinitely expandable display apparatus illustrated in FIG. 1. FIG. 3 is a diagram illustrating a configuration of a display unit in an infinitely expandable display apparatus. FIG. 4 is a diagram illustrating a configuration of a panel driving circuit of a display unit in an infinitely expandable display apparatus. Also, FIG. 5 is a diagram illustrating a configuration of a back cover of a display unit in an infinitely expandable display apparatus.

The infinitely expandable display apparatus according to an embodiment of the present disclosure illustrated in FIG. 1 may include a set board and a cabinet.

The cabinet may include a plurality of display units connected to one another through an interface circuit, and thus, a large screen may be configured. The total resolution of the large screen may be determined as a total sum of unit resolutions of the display units. For example, as in FIG. 2, in a case where the cabinet is configured with sixteen display units having a unit resolution of 480*270, a total resolution of the cabinet may be 1920*1080.

The display units may be based on an electroluminescent display type. In order to realize a zero bezel, an interval (i.e., a seam size) between the display units in the cabinet may be designed to be less than an interval (i.e., a pixel pitch) between pixels. The visibility and readability of a screen may be improved by the zero bezel.

In order to reduce the complexity of a communication interface and the manufacturing cost, the display units may be connected to one another through a unidirectional interface circuit, and particularly, the unidirectional interface circuit may be implemented based on a wireless scheme.

Each of the display units may be an electroluminescent display apparatus which includes a display panel where a plurality of pixels are provided and a panel driving circuit for driving the display panel. The panel driving circuit may include an application specific integrated circuit (ASIC), a data driver, and a gate driver.

A pixel array illustrated in FIG. 3 may be formed in a front surface of a substrate of a display panel. A plurality of subpixels may be provided in the pixel array, and moreover, a plurality of signal lines for supplying a driving voltage to the plurality of subpixels may be disposed in the pixel array. The signal lines may include a plurality of data lines DL for transferring data voltages Vdata, a plurality of gate lines GL1 and GL2 for transferring gate signals SCAN and SEN, and a plurality of readout lines RL for supplying a reference voltage VREF and sensing a pixel driving characteristic Vsen. Also, the signal lines disposed in the pixel array may further include a driving voltage line for transferring a high level pixel voltage EVDD. In the pixel array, the data lines DL and the readout lines RL may be disposed to extend in a first direction, and the gate lines GL1 and GL2 may be disposed to extend in a second direction intersecting with the first direction. The signal lines may be connected to a pixel circuit of each subpixel and may be connected to a panel driving circuit. Also, a low level pixel voltage EVSS may be supplied to the pixel array. Here, the low level pixel voltage EVSS may be a common voltage which is applied to all of the subpixels. The low level pixel voltage EVSS may be applied as a higher voltage in a sensing mode for detecting a driving characteristic than a display mode for displaying an image.

A plurality of subpixels may configure one pixel. For example, red (R), white (W), green (G), and blue (B) subpixels adjacent to one another in the first direction may configure one pixel. Also, the R, G, and B subpixels may configure one pixel, and in this case, the W subpixel may be omitted in the pixel array. The R, W, G, and B subpixels may differ merely in light emitting materials included in light emitting devices thereof and may be substantially the same as each other in terms of configurations of pixel circuits thereof.

Each of the subpixels, as in FIG. 3, may include a light emitting device OLED, a driving thin film transistor (TFT) DT, a plurality of switch TFTs ST1 and ST2, and a storage capacitor Cst. The driving TFT DT and the switch TFTs ST1 and ST2 may each be implemented as an NMOS transistor, but are not limited thereto.

The light emitting device OLED may be a light emitting device which emits light having intensity corresponding to a pixel current input from the driving TFT DT. The light emitting device OLED may be implemented as an organic light emitting diode including an organic light emitting layer, or may be implemented as an inorganic light emitting diode including an inorganic light emitting layer. An anode electrode of the light emitting device OLED may be connected to a second node N2, and a cathode electrode thereof may be connected to an input terminal for the low level pixel voltage EVS S.

The driving TFT DT may be a driving element which generates the pixel current on the basis of a gate-source voltage thereof. A gate electrode of the driving TFT DT may be connected to a first node N1, a first electrode (a drain electrode) may be connected to an input terminal of the high level pixel voltage EVDD, and a second electrode (a source electrode) may be connected to the second node N2.

The switch TFTs (for example, first and second switch TFTs) ST1 and ST2 may be switch elements which set the gate-source voltage and connect the second electrode of the driving TFT DT to the readout line RL.

The first switch TFT ST1 may be connected between the data line DL and the first node N1 and may be turned on based on a first gate signal SCAN applied through a first gate line GL1. The first switch TFT ST1 may be turned on in a setup operation in each of the display mode and the sensing mode. When the first switch TFT ST1 is turned on, a display or sensing data voltage Vdata may be applied to the first node N1. A gate electrode of the first switch TFT ST1 may be connected to the first gate line GL1, a first electrode thereof may be connected to the data line DL, and a second electrode thereof may be connected to the first node N1.

The second switch TFT ST2 may be connected between the readout line RL and the second node N2 and may be turned on based on a second gate signal SEN applied through a second gate line GL2. The second switch TFT ST2 may be turned on in the setup operation in each of the display mode and the sensing mode and may apply the reference voltage VREF to the second node N2. Also, the second switch TFT ST2 may be turned on in performing a sensing operation after the setup operation in the sensing mode and may transfer a source node voltage (or a source voltage) of the driving TFT DT to the readout line RL. Then, a sensing voltage Vsen corresponding to the source voltage may be stored in a parasitic capacitor Cp of the readout line RL. A gate electrode of the second switch TFT ST2 may be connected to the second gate line GL2, a first electrode thereof may be connected to the readout line RL, and a second electrode thereof may be connected to the second node N2.

The storage capacitor Cst may be connected between the first node N1 and the second node N2 and may hold the gate-source voltage of the driving TFT DT during a certain period. In the display mode, the gate-source voltage of the driving TFT DT may be set to a difference voltage between the display data voltage Vdata and the reference voltage VREF, and in the sensing mode, the gate-source voltage of the driving TFT DT may be set to a difference voltage between the sensing data voltage Vdata and the reference voltage VREF.

In the display mode, a pixel current corresponding to the gate-source voltage of the driving TFT DT may flow in the driving TFT DT, and the light emitting device OLED may emit light on the basis of the pixel current. In the sensing mode, the pixel current corresponding to the gate-source voltage of the driving TFT DT may flow in the driving TFT DT, and a source node voltage of the driving TFT DT may vary. The source node voltage may vary based on a driving characteristic of the driving TFT DT, and thus, variation in a driving characteristic of the driving TFT DT may be detected based on the sensing voltage Vsen corresponding to the source node voltage. In the sensing mode, the low level pixel voltage EVSS may be applied to be higher than an operation point voltage of the light emitting device OLED, and thus, the pixel current of the driving TFT DT may not flow to the light emitting device OLED and may flow to only the readout line RL. Accordingly, the source node voltage may be reflected as the sensing voltage Vsen in an early time, and thus, sensing reliability may increase.

A configuration and an operation of the subpixel are merely an embodiment, and the technical spirit of the present disclosure is not limited thereto. For example, the first and second gate signals SCAN and SEN may be provided as one signal, and the first and second gate lines GL1 and GL2 may be provided as one line. Also, the configuration of the subpixel may be designed based on a double rate driving scheme.

An ASIC, as in FIG. 4, may be mounted on a control printed circuit board C-PCB and may be disposed on a rear surface of the substrate of the display panel. The control printed circuit board C-PCB may be connected to a source printed circuit board S-PCB through a connection cable CBL. A conductive film COF with a data driver DIC mounted thereon may be bonded to the source printed circuit board S-PCB. Accordingly, the ASIC may be electrically connected to the data driver DIC, and a signal supply path may be formed therebetween.

A first connection terminal BC-CON1 may be provided in the control printed circuit board C-PCB. The first connection terminal BC-CON1 may be connected to a second connection terminal BC-CON2 provided in a back cover of FIG. 5. A signal reception terminal RX and a signal transfer terminal TX may be installed in the back cover of FIG. 5 so that a unidirectional interface circuit based on a wireless scheme is implemented. The signal reception terminal RX may be wirelessly connected to the signal transfer terminal TX included in a neighbor display unit. Also, the signal transfer terminal TX may be wirelessly connected to the signal reception terminal RX included in another neighbor display unit. The second connection terminal BC-CON2 may be electrically connected to a power socket and may be further connected to the signal reception terminal RX and the signal transfer terminal TX through an internal cable. The power socket may be supplied with an input power from the outside. The input power supplied to the power socket may be supplied to the signal reception terminal RX and the signal transfer terminal TX through the internal cable. Also, the input power supplied to the power socket may be supplied to the ASIC through the first and second connection terminals BC-CON1 and BC-CON2 and may be further supplied to a power circuit. The power circuit may be mounted on the control printed circuit board C-PCB and may process the input power to generate an operation voltage of the data driver DIC, an operation voltage of a gate driver, and operation voltages EVDD and VREF of a pixel. Various operation voltages generated by the power circuit may be supplied to the data driver DIC through the connection cable CBL and the source printed circuit board S-PCB.

Image data output from the set board may be transferred from a neighbor display unit to the signal reception terminal RX. The image data transferred to the signal reception terminal RX may be supplied to the ASIC through the internal cable and the first and second connection terminals BC-CON1 and BC-CON2. The ASIC may process the image data into unit image data on the basis of a unit resolution of the display panel, and then, the unit image data may be stored in a memory. Also, the ASIC may supply image data, remaining after processing, to the signal transfer terminal TX through the internal cable and the first and second connection terminals BC-CON1 and BC-CON2. Then, the signal transfer terminal TX may transfer the image data, remaining after the processing, to another neighbor display unit.

The ASIC may supply the data driver DIC with the unit image data, obtained through processing based on the unit resolution, and timing control signals synchronized with the unit image data through the signal supply path.

Moreover, the ASIC may receive the driving command signal, generated by the set board, through the signal reception terminal RX. The driving command signal transferred to the signal reception terminal RX may be supplied to the ASIC through the internal cable and the first and second connection terminals BC-CON1 and BC-CON2. The ASIC may analyze unit identification information included in the driving command signal to determine whether the ASIC is a command execution target. When the ASIC is the command execution target, the ASIC may execute the driving command signal and may transfer an execution result signal based thereon to another neighbor display unit. The execution result signal may be fed back to the set board through a feedback loop line based on a cascading scheme. When the ASIC is not the command execution target, the ASIC may bypass the driving command signal to another neighbor display unit.

In an embodiment of the present disclosure, the driving command signal may be a signal for transferring a driving command to at least one of the display units, and the execution result signal may be defined as a signal for transferring an execution result corresponding to the driving command.

The data driver DIC may include a digital-analog converter DAC which generates the data voltage Vdata, a sensing circuit SENU, and an analog-digital converter ADC. In the display mode, the digital-analog converter DAC may convert the image data supplied from the ASIC to generate the display data voltage Vdata on the basis of a timing control signal and may supply the display data voltage Vdata to the data lines DL. In the sensing mode, the digital-analog converter DAC may generate a predetermined sensing data voltage Vdata and may supply the sensing data voltage Vdata to the data lines DL.

In the display mode, the sensing circuit SENU may supply the reference voltage VREF to the readout lines RL. In the sensing mode, the sensing circuit SENU may supply the reference voltage VREF to the readout lines RL and may sample the sensing voltage Vsen charged into the readout lines RL. The sensing circuit SENU may include a reference voltage switch SPRE, connected between the readout line RL and a reference voltage VREF input terminal, and a sampling switch SAM connected between the readout line RL and the analog-digital converter ADC. The reference voltage switch SPRE may be turned on in only a setup period of the display mode/sensing mode, and the sampling switch SAM may be turned on in only a sampling period of the sensing mode.

The analog-digital converter ADC may digital-process a sampling voltage, generated when the sampling switch SAM is turned on in the sensing mode, to output sensing result data SDATA. The sensing result data SDATA may be the execution result signal based on the driving command signal.

The gate driver may receive an operation voltage and a timing control signal through the data driver DIC. The gate driver may be embedded into a non-display area outside the pixel array of the display panel. The data driver may generate the first and second gate signals SCAN and SEN on the basis of the timing control signal and may supply the first and second gate signals SCAN and SEN to the first and second gate lines GL1 and GL2. In the display mode, the first and second gate signals SCAN and SEN may be for selecting a pixel line to which the display data voltage Vdata is to be applied, and in the sensing mode, the first and second gate signals SCAN and SEN may be for selecting a sensing target pixel line. Here, a pixel line may denote a set of signal lines and pixels adjacent to one another in the second direction.

Figure 6:
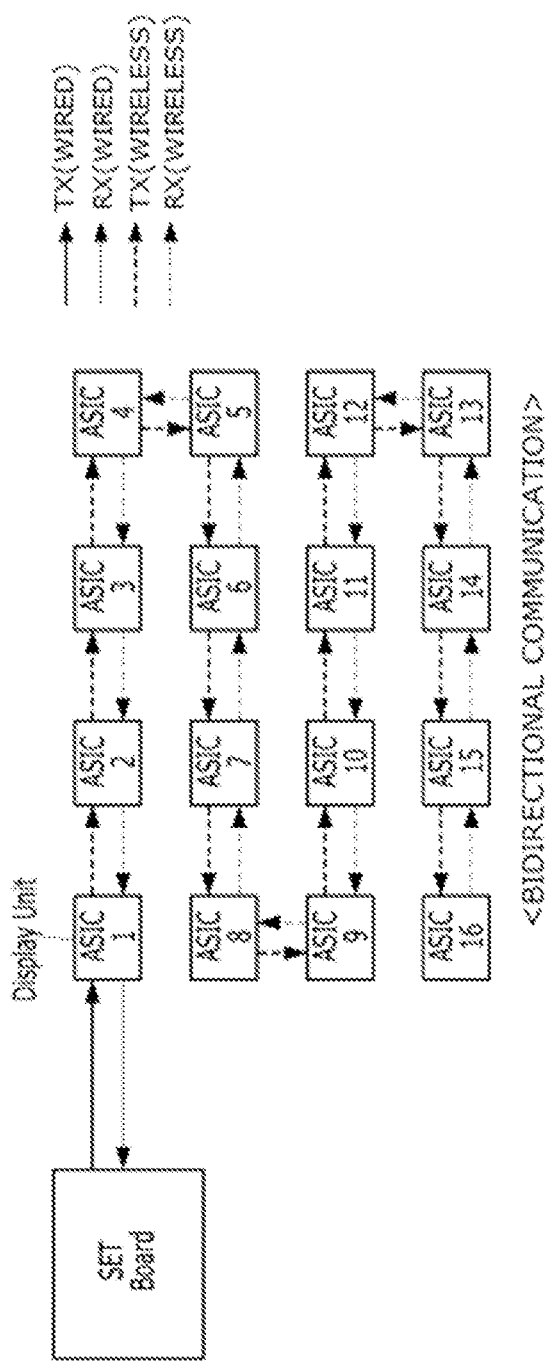
FIG. 6 is a diagram illustrating a comparative example where display units in an infinitely expandable display apparatus are connected to one another through a bidirectional interface circuit.

FIG. 6 is a diagram illustrating a comparative example where display units in an infinitely expandable display apparatus are connected to one another through a bidirectional interface circuit. In FIG. 6, a wired TX illustrated by a thick solid line arrow represents a signal transfer direction from a set board to a cabinet, and a wired RX illustrated by a thin solid line arrow represents a signal feedback direction from the cabinet to the set board. Also, a wireless TX illustrated by a thick dotted line arrow represents a signal transfer direction between ASICs, and a wireless RX illustrated by a thin dotted line arrow represents a signal feedback direction between the ASICs.

Referring to FIG. 6, in an infinitely expandable display apparatus according to a comparative example, display units are connected to one another on the basis of a bidirectional communication scheme using the wireless TX and the wireless RX Image data and a driving command signal, transferred from the set board through the wired TX, are sequentially transferred and processed in a signal transfer direction based on a cascading order from an ASIC1 to an ASIC16. Execution result signals generated by one or more of the ASIC1 to the ASIC16 on the basis of the driving command signal are sequentially transferred in a signal feedback direction based on a cascading reverse order from the ASIC16 to the ASIC1. The ASIC1 transfers the execution result signal to the set board to feed back the execution result signal.

According to the bidirectional communication scheme, each display unit should include two signal reception terminals RX and two signal transfer terminals TX, and due to this, a communication interface between the display units is complicated and the manufacturing cost is high.

Figure 7:
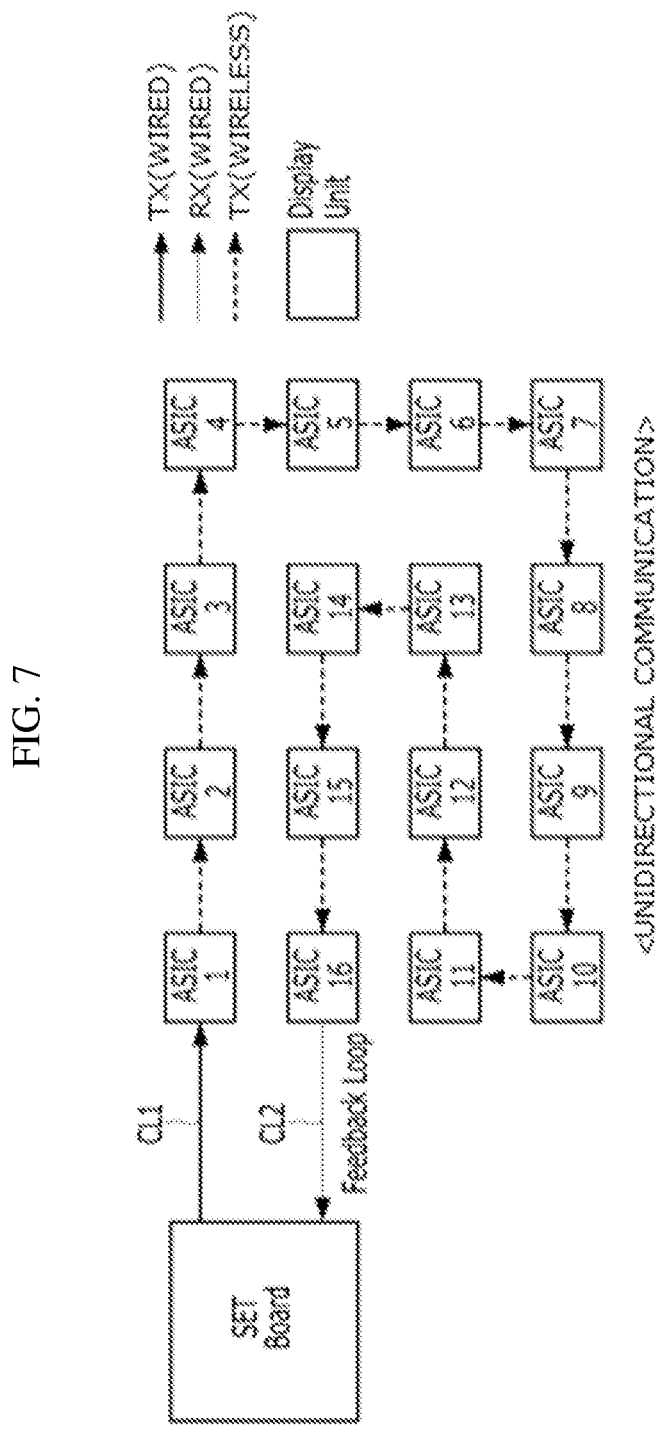
FIG. 7 is a diagram illustrating an embodiment where display units in an infinitely expandable display apparatus are connected to one another through a unidirectional interface circuit on the basis of a cascading scheme.

FIG. 7 is a diagram illustrating an embodiment where display units in an infinitely expandable display apparatus are connected to one another through a unidirectional interface circuit on the basis of a cascading scheme. In FIG. 7, a wired TX illustrated by a thick solid line arrow represents a signal transfer direction from a set board to a cabinet, and a wired RX illustrated by a thin solid line arrow represents a signal feedback direction from the cabinet to the set board. Also, a wireless TX illustrated by a dotted line arrow represents a signal transfer direction between ASICs.

Referring to FIG. 7, in an infinitely expandable display apparatus according to an embodiment of the present disclosure, display units are connected to one another on the basis of a unidirectional communication scheme based on the cascading scheme. Image data and a driving command signal, transferred from the set board through the wired TX, are sequentially transferred and processed in a signal transfer direction based on a cascading order from an ASIC1 to an ASIC16. Likewise, execution result signals generated by one or more of the ASIC1 to the ASIC16 on the basis of the driving command signal are sequentially transferred in a signal transfer direction based on the cascading order from the ASIC1 to the ASIC16. The ASIC16 transfers the execution result signal to the set board to feed back the execution result signal.

According to the unidirectional communication scheme, each display unit includes one signal reception terminal RX and one signal transfer terminal TX, and thus, a communication interface between the display units may be simplified and the manufacturing cost may be reduced. Also, when a communication interface between display units is implemented in a short-distance wireless communication scheme, the simplification effect and convenience of screen expansion may increase. The short-distance wireless communication scheme may be implemented as an infrared scheme, but the present embodiment is not limited thereto.

Because each display unit includes one signal reception terminal RX and one signal transfer terminal TX so that the unidirectional communication scheme is implemented, a first display unit (the ASIC1 is provided therein) and a last display unit (the ASIC16 is provided therein) may be changed. The first display unit and the last display unit may be disposed closer to the set board than the other display units, for an effective communication connection with the set board.

The set board is connected to the first display unit and the last display unit through a set interface circuit. The set board transfers the driving command signal to the cabinet through a first communication line CL1 included in the set interface circuit and receives, through feedback, the execution result signal from the cabinet through a second communication line CL2 included in the set interface circuit. The set interface circuit is illustrated by a wired line in FIG. 7, and the technical spirit of the present disclosure is not limited thereto. When a separation distance between the set board and the cabinet is short, the set board and the cabinet may be connected to each other through a wireless interface circuit instead of a wired communication cable.

As described above, because the second communication line CL2 and the unidirectional interface circuit connecting display units configure a feedback loop line, closed loop control may be implemented with only an interface which is simple and is low in cost. Based on the closed loop control, the set board may transfer an image quality-related command to a desired specific display unit and may receive the execution result signal from the specific display unit through feedback. Also, the set board may transfer a sensing-related command to a desired specific display unit and may receive the execution result signal from the specific display unit through feedback.

Figure 8:
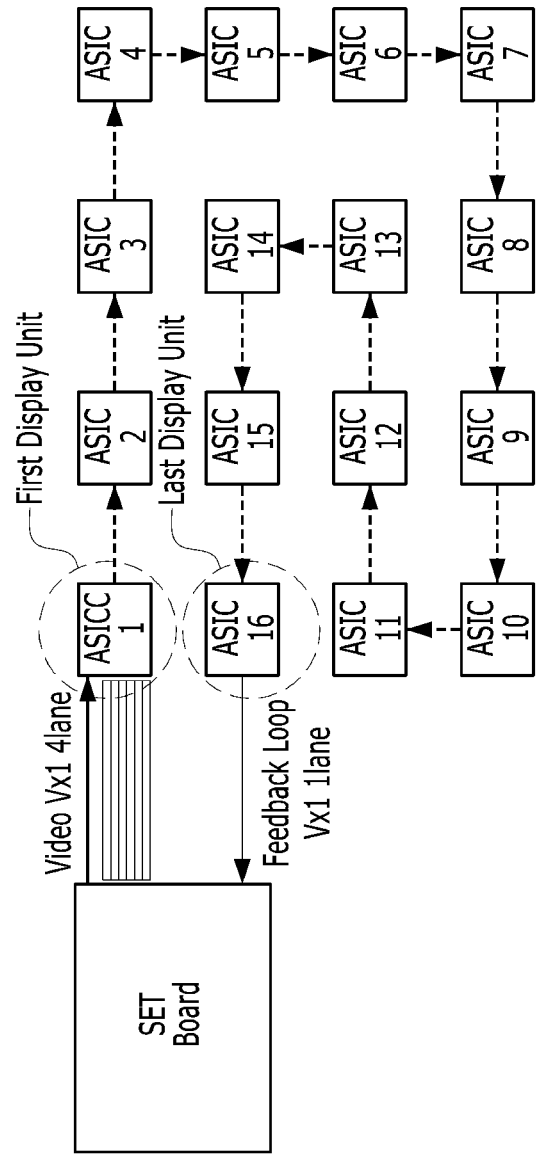
FIGS. 8 and 9 are diagrams for describing a set interface circuit connecting a set board to a cabinet in an infinitely expandable display apparatus.
Figure 9:
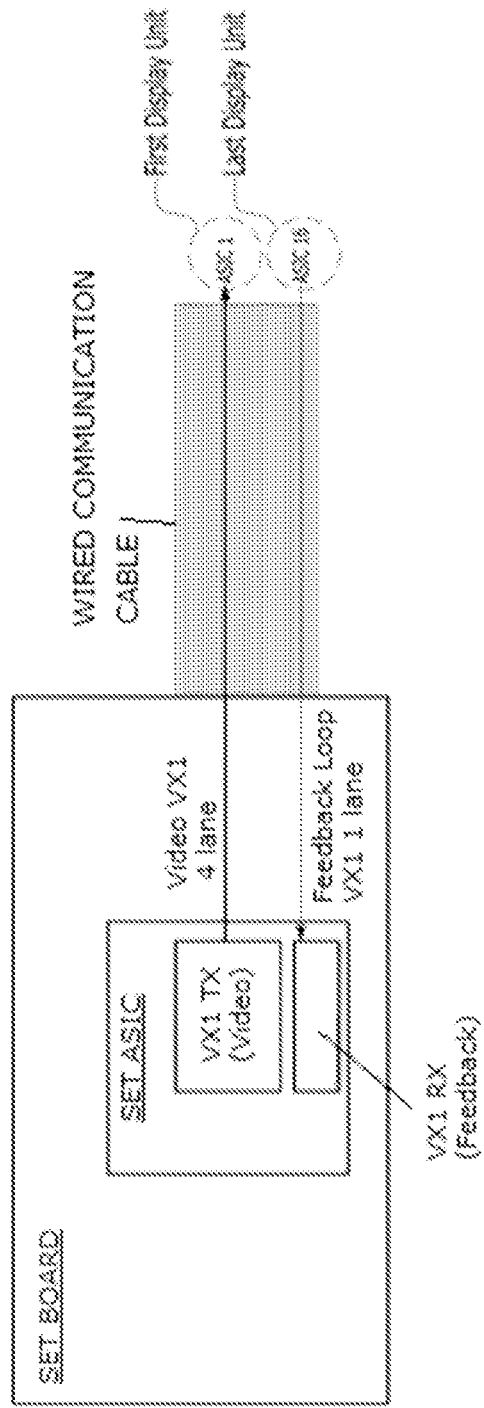

FIGS. 8 and 9 are diagrams for describing a set interface circuit connecting a set board to a cabinet in an infinitely expandable display apparatus.

Referring to FIGS. 8 and 9, a set interface circuit and a unidirectional interface circuit may be implemented based on a V-by-One (V×1) scheme capable of high-speed and large-capacity interfacing, but are not limited thereto. The set interface circuit may be replaced with another serial communication scheme (for example, serial peripheral interface (SPI), I2C, controller area network (CAN), and universal asynchronous receiver/transmitter (UART)).

When a total resolution of the cabinet is 1920*1080, each of the set interface circuit and the unidirectional interface circuit may need four transfer lanes. The unidirectional interface circuit may use, as a feedback loop line, one transfer lane of the four transfer lanes, and an interface circuit for implementing a feedback mechanism may be more simplified.

In FIG. 9, as an example where the set interface circuit is implemented with a wired communication cable, it is illustrated that a set ASIC included in a set board is connected to an ASIC1 of a cabinet through four transfer lanes and is connected to an ASIC16 through one transfer lane.

Figure 10:
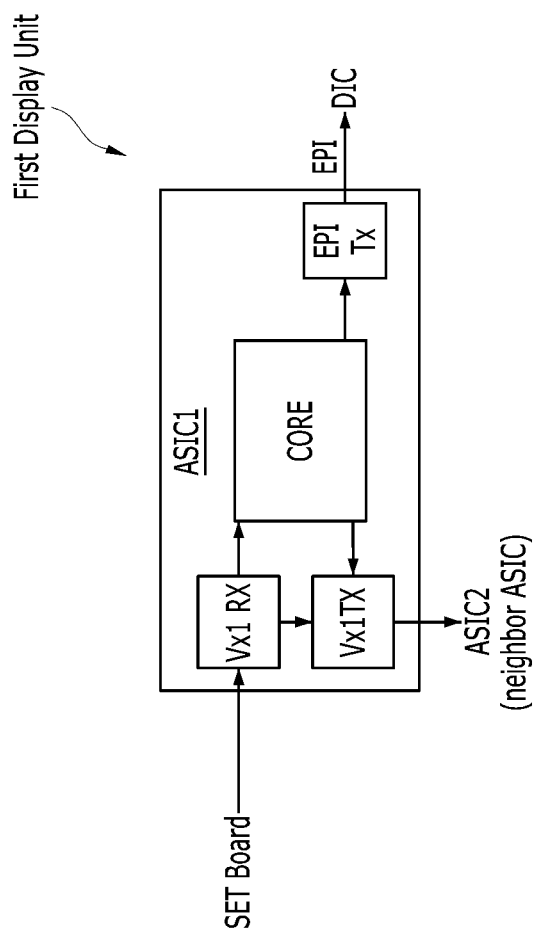
FIG. 10 is a diagram illustrating an application specific integrated circuit of a first display unit based on the cascading scheme.

FIG. 10 is a diagram illustrating an application specific integrated circuit of a first display unit based on the cascading scheme.

Referring to FIG. 10, the ASIC1 of the first display unit may include a signal reception circuit (V×1 RX), a processor (CORE), a signal transfer circuit (V×1 TX), and an EPI transfer circuit (EPI TX).

The signal reception circuit (V×1 RX) may receive image data divisionally transferred through four transfer lanes and may receive a driving command signal transferred through a specific period of one transfer lane among the four transfer lanes.

The processor (CORE) may process the received image data into unit image data on the basis of the unit resolution of the display panel and may output the unit image data and a timing control signal, synchronized with the unit image data, to the data driver DIC through the EPI transfer circuit (EPI TX).

The processor (CORE) may determine whether the processor (CORE) is a command execution target, on the basis of the received driving command signal and unit identification information. When the processor (CORE) is the command execution target, the processor (CORE) may execute the driving command signal to generate an execution result signal based thereon. When the processor (CORE) is not the command execution target, the processor (CORE) may bypass the driving command signal.

The signal transfer circuit (V×1 TX) may divisionally transfer image data, remaining after processing by the processor (CORE), to a next-order display unit (an ASIC2 is provided therein) through four transfer lanes. The signal transfer circuit (V×1 TX) may transfer the execution result signal or the driving command signal to the next-order display unit (the ASIC2 is provided therein) through a specific period of one transfer lane among the four transfer lanes.

Configurations and operations of next-order display units (ASIC2 to ASIC16 are respectively provided therein) illustrated in FIGS. 7 and 8 may be substantially the same as a configuration and an operation of the first display unit.

Figure 11:
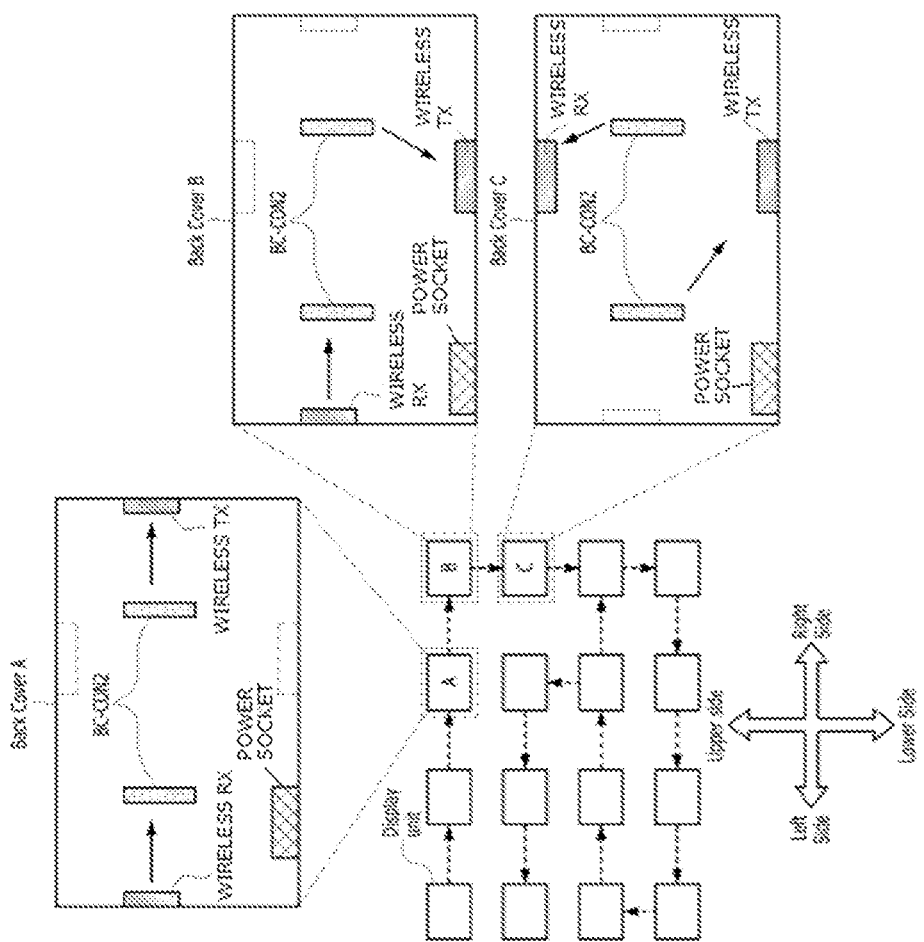
FIG. 11 is a diagram illustrating an embodiment which is designed so that relative positions of transfer and reception terminals of a unidirectional interface circuit are changed based on arrangement positions of display units configuring a cabinet.

FIG. 11 is a diagram illustrating an embodiment which is designed so that relative positions of transfer and reception terminals of a unidirectional interface circuit are changed based on arrangement positions of display units configuring a cabinet.

Referring to FIG. 11, based on the easiness of a connection between display units configuring a cabinet, a signal reception terminal RX, a signal transfer terminal TX, and a power socket may be installed in a back cover of each display unit. The signal reception terminal RX and the signal transfer terminal TX may be included in a unidirectional interface circuit in a broad sense.

Relative positions of the signal reception terminal RX and the signal transfer terminal TX may differ based on an arrangement position of each display unit in the cabinet. For example, in a display unit A, the signal reception terminal RX may be disposed at a left edge of a back cover, and the signal transfer terminal TX may be disposed at a right edge of the back cover. In a display unit B, the signal reception terminal RX may be disposed at a left edge of a back cover, and the signal transfer terminal TX may be disposed at a right lower edge of the back cover. In a display unit C, the signal reception terminal RX may be disposed at an upper edge of a back cover, and the signal transfer terminal TX may be disposed at a lower edge of the back cover.

In this case, based on the change easiness of the number of connections or connection positions of display units, an internal cable for connecting the signal transfer/reception terminals TX/RX to the second connection terminal BC-CON2 may be previously patterned in all of an upper portion, a lower portion, a left portion, and a right portion in a back cover of each display unit. Dotted-line boxes illustrated in display units A, B, and C represent virtual positions of the signal transfer/reception terminals TX/RX for the change easiness. The virtual positions may be connected to the second connection terminal BC-CON2 through the previously patterned internal cable.

Figure 12:
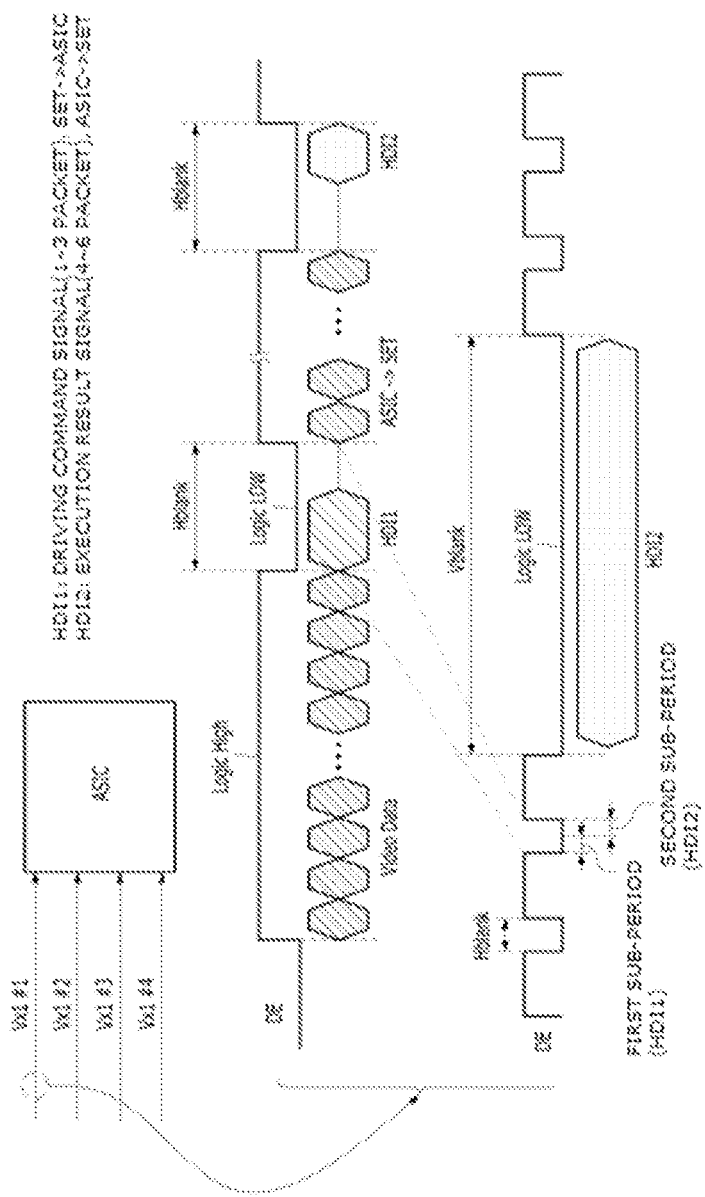
FIG. 12 is a diagram showing a transfer timing of each of image data, a driving command signal, and an execution result signal transferred and received between display units through the cascading scheme.

FIG. 12 is a diagram showing a transfer timing of each of image data, a driving command signal, and an execution result signal transferred and received between display units through the cascading scheme.

Referring to FIG. 12, a unidirectional interface circuit connecting display units may include four transfer lanes V×1 #1 to V×1 #4, and one transfer lane V×1 thereof may be previously set as a feedback loop line.

The feedback loop line may transfer a portion of image data, a driving command signal HDI1, and an execution result signal HDI2 between the display units on the basis of the cascading scheme. In order to prevent data interference or data mixing in the one transfer lane V×1, the driving command signal HDI1 and the execution result signal HDI2 may be transferred in a blank time at which image data is not transferred. The blank time may be defined with respect to a data enable signal DE. For the blank time, the data enable signal DE may maintain a logic low state. The image data may be transferred for an active time at which the data enable signal DE maintains a logic high state.

The blank time may include a horizontal blank period Hblank having a first length and a vertical blank period Vblank having a second length which is longer than the first length. The horizontal blank period Hblank may include a first sub-period and a second sub-period which are temporally divided.

The driving command signal HDI1 may include an image quality-related command signal, a sensing command signal, a write or read command signal corresponding to a specific address register, and a write or read command signal of a specific memory area. The driving command signal HDI1 may further include unit identification information for designating a display unit for executing a command signal.

The image quality-related command signal may include a gamma curve change request, a resolution change request, a display/sensing mode change request, a color coordinate change request, and a maximum brightness change request, which correspond to one or more display units. The sensing command signal may denote a request for sensing a pixel driving characteristic of each of specific pixel lines of one or more display units.

Because the driving command signal HDI1 is low in amount of information, the driving command signal HDI1 may be transferred in the first sub-period of the horizontal blank period Hblank. For example, the driving command signal HDI1 may be included in first to third data transfer packets which are to be transferred in the first sub-period of the horizontal blank period Hblank.

An execution result signal HDI2 corresponding to the image quality-related command signal may be an ack signal representing that changing of a gamma curve, a resolution, a mode, color coordinates, and maximum brightness is completed. An execution result signal HDI2 corresponding to a write command signal for a specific address register or a memory area may be an ack signal representing that a write operation is completed. Also, an execution result signal HDI2 corresponding to a read command signal for a specific address register or a memory area may be a readout result value.

An execution result signal HDI2, which is not high in amount of information like the execution result signal HDI2 corresponding to the image quality-related command signal and the execution result signal HDI2 corresponding to the write command signal for the specific address register or the memory area, may be transferred in the second sub-period of the horizontal blank period Hblank. For example, the execution result signal HDI2 corresponding to the image quality-related command signal may be included in fourth to sixth data transfer packets which are to be transferred in the second sub-period of the horizontal blank period Hblank.

Figure 13:
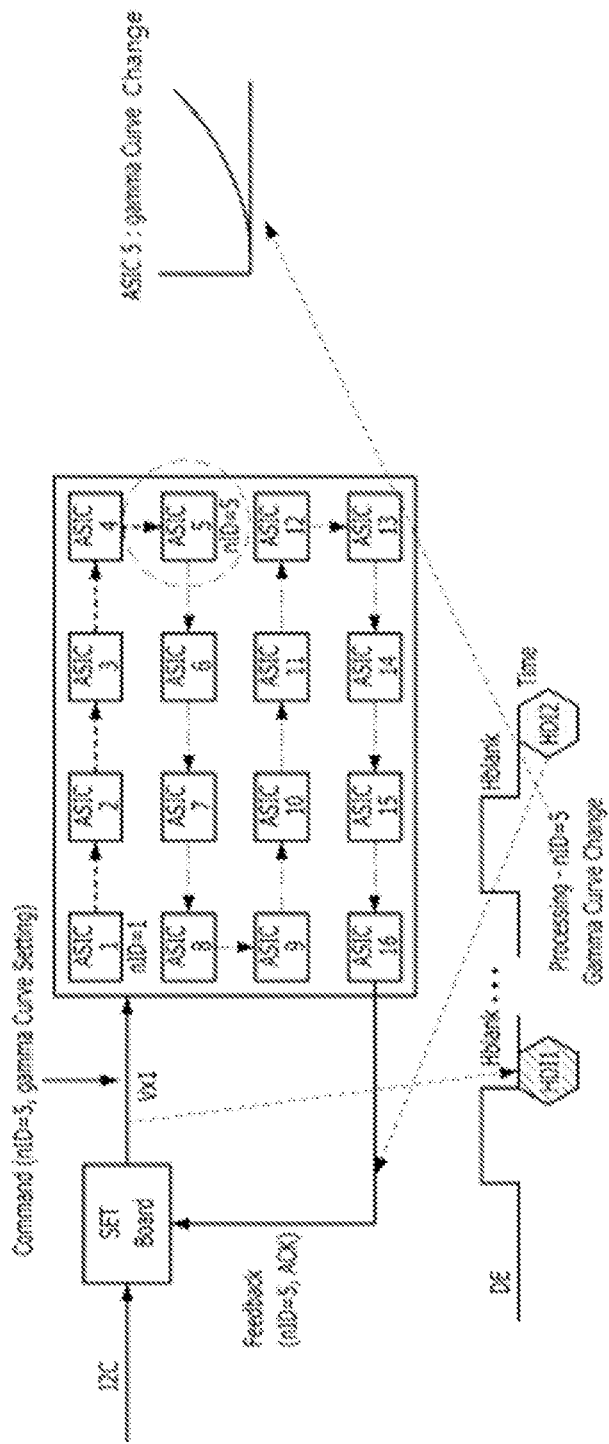
FIGS. 13 and 14 are diagrams for describing a request-execution-response process when a driving command signal is an image quality-related command signal.
Figure 14:
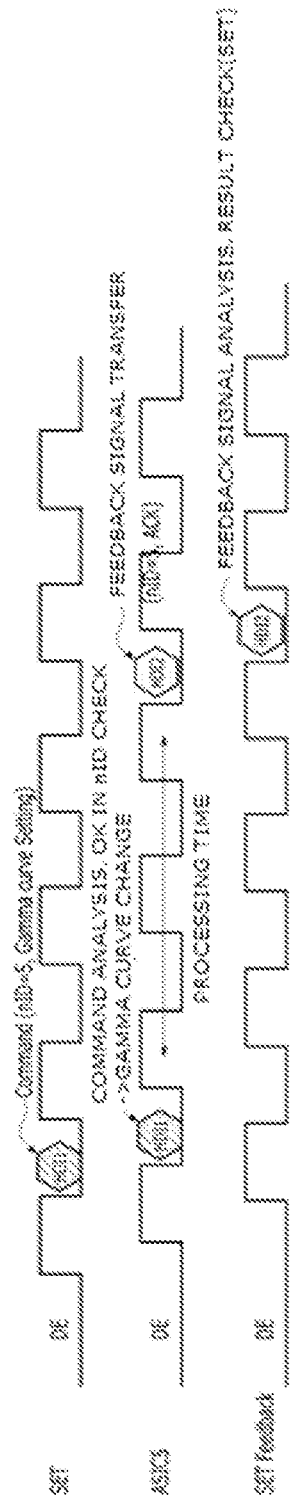

FIGS. 13 and 14 are diagrams for describing a request-execution-response process when a driving command signal is an image quality-related command signal.

Referring to FIGS. 13 and 14, a driving command signal HDI1 may relate to a gamma curve change request of a fifth display unit including an ASIC5. In this case, the driving command signal HDI1 may include unit identification information about the fifth display unit.

The driving command signal HDI1 may be transferred from a set board to a cabinet. In the cabinet, the driving command signal HDI1 may be transferred to the fifth display unit through a unidirectional interface circuit illustrated by a dotted line arrow on the basis of the cascading scheme. In this case, a transfer timing of the driving command signal HDI1 may correspond to a first sub-period of a horizontal blank period Hblank.

The ASIC5 may change a gamma curve for a certain processing time on the basis of the result of analysis of the unit identification information and may generate an execution result signal HDI2 representing the completion of change. The ASIC5 may transfer the execution result signal HDI2 in a second sub-period of a horizontal blank period Hblank after change is completed. The execution result signal HDI2 may be transferred to a sixteenth display unit through a unidirectional interface circuit illustrated by a dotted line arrow on the basis of the cascading scheme, and then, may be fed back from the sixteenth display unit to the set board. The set board may analyze the execution result signal HDI2 to check an execution result.

Figure 15:
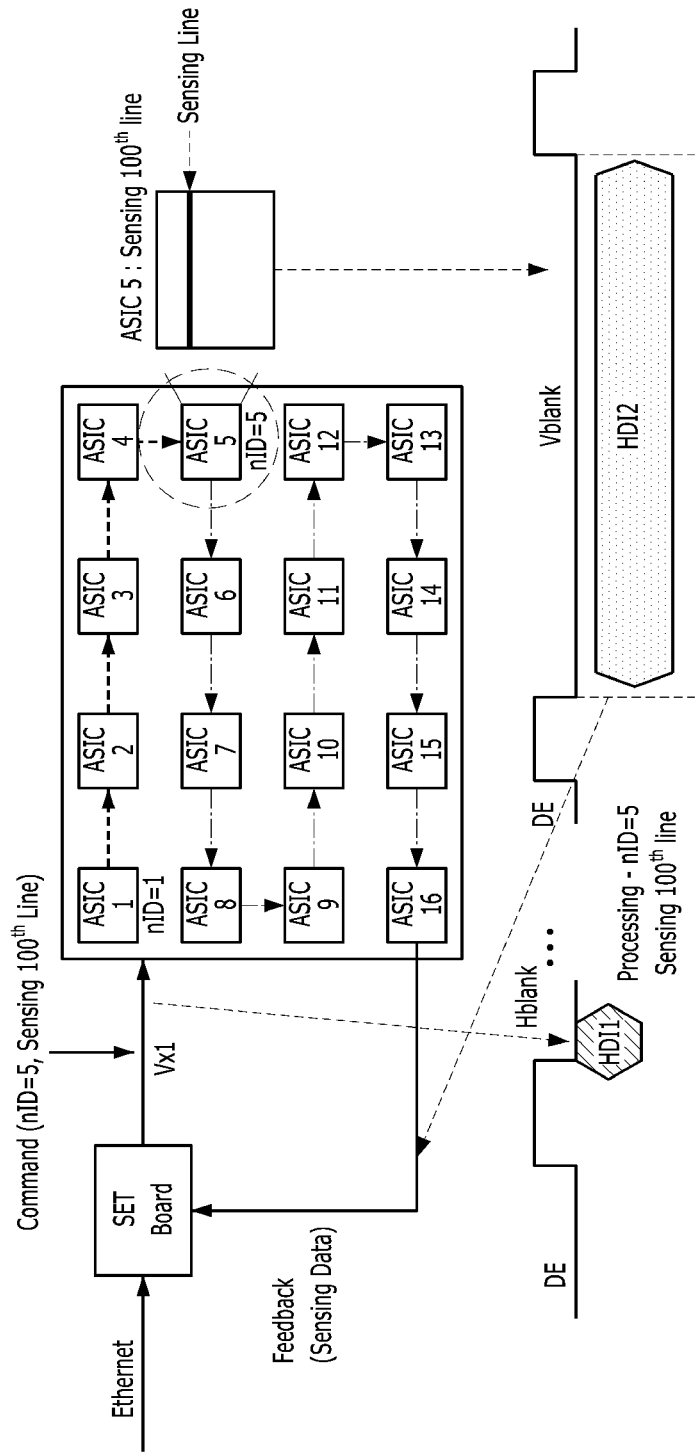
FIGS. 15 and 16 are diagrams for describing a request-execution-response process when a driving command signal is a sensing command signal.
Figure 16:
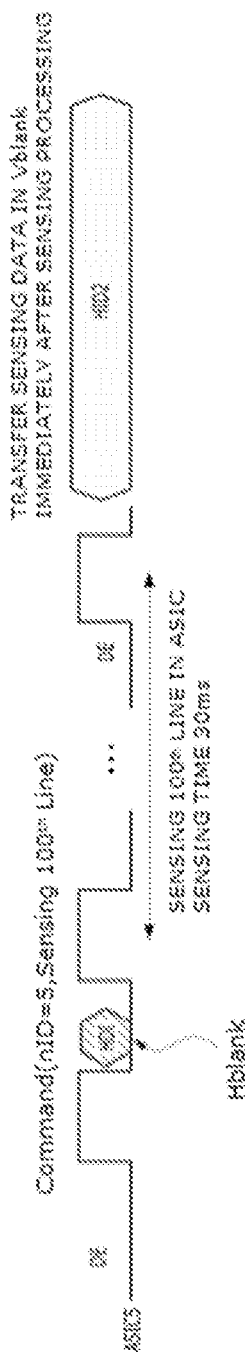

FIGS. 15 and 16 are diagrams for describing a request-execution-response process when a driving command signal is a sensing command signal.

Referring to FIGS. 15 and 16, a driving command signal HDI1 may be a request which issues a command to sense a pixel driving characteristic of a $100^{th}$ pixel line of a fifth display unit including an ASIC5. In this case, the driving command signal HDI1 may include unit identification information about the fifth display unit.

The driving command signal HDI1 may be transferred from a set board to a cabinet. In the cabinet, the driving command signal HDI1 may be transferred to the fifth display unit through a unidirectional interface circuit illustrated by a dotted line arrow on the basis of the cascading scheme. In this case, a transfer timing of the driving command signal HDI1 may correspond to a first sub-period of a horizontal blank period Hblank.

The ASIC5 may operate a data driver and a gate driver in the sensing mode for a certain processing time on the basis of the result of analysis of the unit identification information and may sense the pixel driving characteristic of the $100^{th}$ pixel line. The ASIC5 may receive sensing result data based on a sensing operation (i.e., an execution result signal HDI2) from the data driver. The ASIC5 may transfer the execution result signal HDI2 in a vertical blank period Vblank immediately after sensing processing. The execution result signal HDI2 may be transferred to a sixteenth display unit through a unidirectional interface circuit illustrated by a dotted line arrow on the basis of the cascading scheme, and then, may be fed back from the sixteenth display unit to the set board. The set board may analyze the execution result signal HDI2 to check an execution result.

Figure 17:
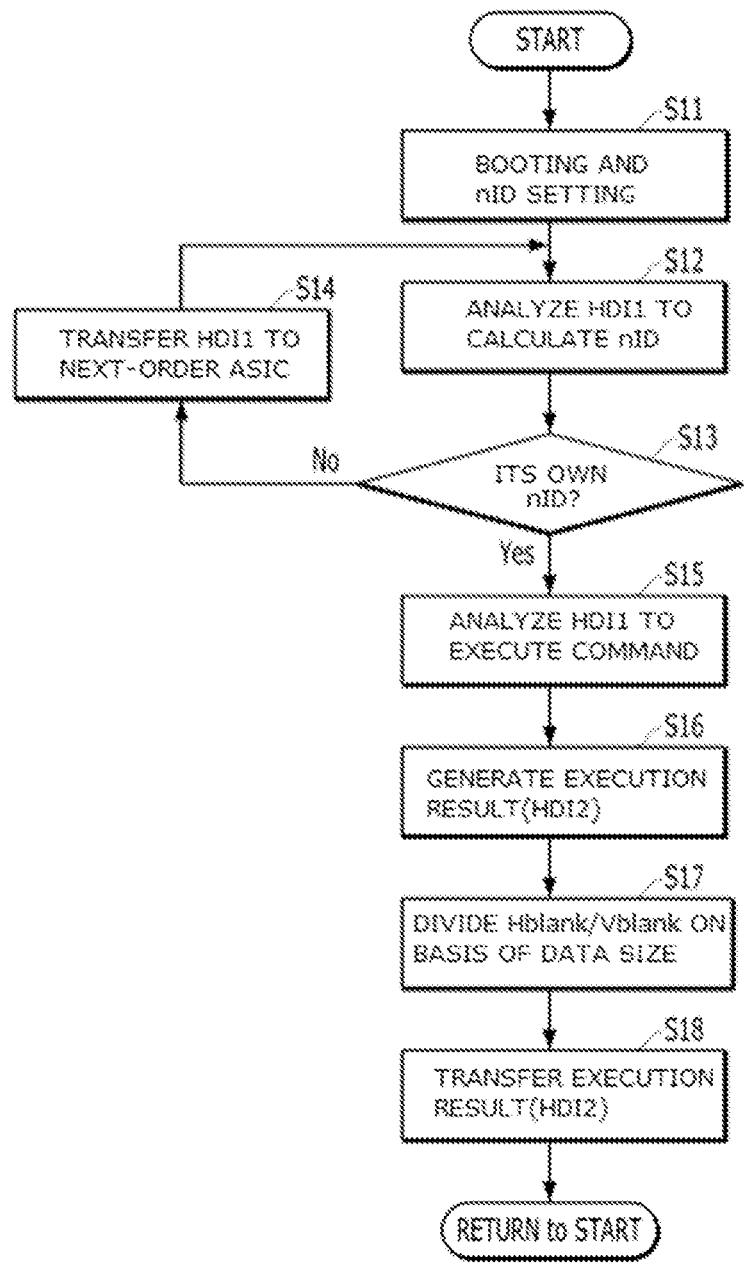
FIG. 17 is a diagram illustrating a driving method of an infinitely expandable display apparatus according to an embodiment of the present disclosure.

FIG. 17 is a diagram illustrating a driving method of an infinitely expandable display apparatus according to an embodiment of the present disclosure.

Referring to FIG. 17, the driving method of the infinitely expandable display apparatus according to an embodiment of the present disclosure assign (set) unit identification information about each of the display units in a set board through a booting process based on a source power (S11). Also, the set board may output a driving command signal HDI1 including the unit identification information.

A corresponding display unit corresponding to the unit identification information included in the driving command signal HDI1 may execute a driving command to generate an execution result signal HDI2 and may sequentially transfer the execution result signal HDI2 to neighbor display units in a blank time (a vertical blank period or a horizontal blank period on the basis of the amount of data information) at which image data is not transferred. The execution result signal HDI2 may be fed back to the set board on the basis of the cascading scheme (S12 to S18).

The present embodiment may realize the following effects.

In the infinitely expandable display apparatus according to the embodiments of the present disclosure, a feedback loop line may be implemented by using a unidirectional interface circuit based on a cascading scheme, and a driving command signal and an execution result signal based thereon may be transferred, thereby simplifying an interface and decreasing the manufacturing cost.

The infinitely expandable display apparatus according to the embodiments of the present disclosure may transfer the driving command signal and the execution result signal by using a blank time at which image data is not transferred in the feedback loop line, thereby preventing undesired data interference and increasing operation stability.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. An infinitely expandable display apparatus comprising:
a cabinet including a plurality of display units each having an application specific integrated circuit embedded therein;
a set board generating a driving command signal for driving of the cabinet; and
a set interface circuit connecting the set board to the cabinet,
wherein
the plurality of display units are connected to one another through a unidirectional interface circuit, and at least one of the plurality of display units transfers the driving command signal and an execution result signal based thereon to a neighbor display unit of the plurality of display units on the basis of a cascading scheme,
the set board transfers the driving command signal to a first display unit of the plurality of display units based on the cascading scheme through a first communication line included in the set interface circuit, and
a last display unit of the plurality of display units based on the cascading scheme transfers the execution result signal to the set board through a second communication line included in the set interface circuit.

2. The infinitely expandable display apparatus of claim 1, wherein the first display unit and the last display unit are disposed closer to the set board than other display units of the plurality of display units.

3. The infinitely expandable display apparatus of claim 1, wherein the second communication line configures a feedback loop line along with one transfer lane of the unidirectional interface circuit.

4. The infinitely expandable display apparatus of claim 1, wherein
the set interface circuit is a wired or wireless communication interface circuit, and
the plurality of display units are connected to one another through the unidirectional interface circuit based on a short-distance wireless communication scheme.

5. The infinitely expandable display apparatus of claim 4, wherein
the unidirectional interface circuit comprises a signal reception terminal and a signal transfer terminal installed in a back cover of each of the plurality of display units, and
relative positions of the signal reception terminal and the signal transfer terminal are designed to be changed based on an arrangement position of each of the display units in the cabinet.

6. The infinitely expandable display apparatus of claim 1, wherein
the set board further generates image data for driving of the cabinet and further transfers the image data to the first display unit through the first communication line, and a portion of the image data, the driving command signal, and the execution result signal are transferred and received between the plurality of display units through one transfer lane of the unidirectional interface circuit.

7. The infinitely expandable display apparatus of claim 6, wherein the driving command signal and the execution result signal are transferred in a blank time at which the image data is not transferred.

8. The infinitely expandable display apparatus of claim 7, wherein a data enable signal maintains a logic low state in the blank time.

9. The infinitely expandable display apparatus of claim 7, wherein the blank time comprises a horizontal blank period having a first length and a vertical blank period having a second length which is longer than the first length.

10. The infinitely expandable display apparatus of claim 9, wherein
the horizontal blank period comprises a first sub-period and a second sub-period which are temporally divided,
the driving command signal is transferred in the first sub-period of the horizontal blank period, and
the execution result signal is transferred in the second sub-period of the horizontal blank period or the vertical blank period.

11. The infinitely expandable display apparatus of claim 10, wherein
the driving command signal comprises at least one of an image quality-related command signal, a sensing command signal, a write or read command signal corresponding to a specific address register, and a write or read command signal of a specific memory area,
the image quality-related command signal is a command signal for changing image quality of at least one of the plurality of display units, and
the sensing command signal is a command signal for sensing a pixel driving characteristic of at least one of the plurality of display units.

12. The infinitely expandable display apparatus of claim 11, wherein the driving command signal further comprises unit identification information for designating a display unit of the plurality of display units for executing a driving command.

13. The infinitely expandable display apparatus of claim 12, wherein the display unit corresponding to the unit identification information performs an operation based on the driving command signal for a certain time and transfers the execution result signal in the second sub-period of the horizontal blank period disposed after the certain time or the vertical blank period disposed after the certain time.

14. The infinitely expandable display apparatus of claim 1, wherein the first display unit differs from the last display unit.

15. A driving method of an infinitely expandable display apparatus including a cabinet including a plurality of display units each having an application specific integrated circuit embedded therein and a set board connected to the cabinet, the driving method comprising:
outputting a driving command signal for driving of the cabinet by using the set board; and
transferring the driving command signal and an execution result signal based thereon to a neighbor display unit of the plurality of display units on the basis of a cascading scheme by using at least one of the plurality of display units connected to one another through a unidirectional interface circuit,
wherein
the driving command signal output from the set board is transferred to a first display unit of the plurality of display units based on the cascading scheme, and
the execution result signal output from a last display unit of the plurality of display units based on the cascading scheme is transferred to the set board.

16. The driving method of claim 15, wherein the transferring of the driving command signal and the execution result signal comprises:
executing the driving command signal to generate the execution result signal by using a corresponding display unit of the plurality of display units corresponding to unit identification information included in the driving command signal; and
transferring the execution result signal from the corresponding display unit to a neighbor display unit of the plurality of display units in a blank time at which image data is not transferred.

17. The driving method of claim 16, wherein the blank time comprises a horizontal blank period having a first length and a vertical blank period having a second length which is longer than the first length.

18. The driving method of claim 17, wherein
the horizontal blank period comprises a first sub-period and a second sub-period which are temporally divided,
the driving command signal is transferred in the first sub-period of the horizontal blank period, and
the execution result signal is transferred in the second sub-period of the horizontal blank period or the vertical blank period.

* * * * *